United States Patent
Gentry

(10) Patent No.: US 7,814,326 B2
(45) Date of Patent: Oct. 12, 2010

(54) SIGNATURE SCHEMES USING BILINEAR MAPPINGS

(75) Inventor: Craig B. Gentry, Mountain View, CA (US)

(73) Assignee: NTT Docomo, Inc., Tokyo (JP)

( * ) Notice: Subject to any disclaimer, the term of this patent is extended or adjusted under 35 U.S.C. 154(b) by 295 days.

(21) Appl. No.: 11/955,105

(22) Filed: Dec. 12, 2007

(65) Prior Publication Data

US 2008/0133926 A1 Jun. 5, 2008

Related U.S. Application Data

(62) Division of application No. 10/499,853, filed as application No. PCT/US2003/011821 on Apr. 15, 2003, now Pat. No. 7,533,270.

(60) Provisional application No. 60/372,668, filed on Apr. 15, 2002.

(51) Int. Cl.
H04L 9/32 (2006.01)
H04L 9/00 (2006.01)
(52) U.S. Cl. .................................. 713/176; 380/44
(58) Field of Classification Search ............... 713/176; 380/44
See application file for complete search history.

(56) References Cited

U.S. PATENT DOCUMENTS

| | | | |
|---|---|---|---|
| 4,309,569 A | 1/1982 | Merkle | |
| 5,432,852 A | 7/1995 | Leighton et al. | |
| 5,590,197 A | 12/1996 | Chen et al. | |
| 5,825,880 A | 10/1998 | Sudia et al. | |
| 6,035,041 A | 3/2000 | Frankel et al. | |
| 6,088,798 A * | 7/2000 | Shimbo | 713/176 |
| 6,108,783 A | 8/2000 | Krawczyk et al. | |
| 6,141,420 A | 10/2000 | Vanstone et al. | |
| 6,212,637 B1 | 4/2001 | Ohta et al. | |
| 6,411,716 B1 | 6/2002 | Brickell | |
| 6,539,043 B1 | 3/2003 | Shinozaki et al. | |
| 6,618,483 B1 | 9/2003 | Vanstone et al. | |
| 6,748,530 B1 | 6/2004 | Aoki | |
| 6,760,441 B1 | 7/2004 | Ellison et al. | |
| 6,826,687 B1 | 11/2004 | Rohatgi | |
| 6,886,296 B1 | 5/2005 | John et al. | |
| 6,912,659 B2 * | 6/2005 | Labaton | 713/176 |

(Continued)

FOREIGN PATENT DOCUMENTS

EP 1 051 036 A2 8/2000

(Continued)

OTHER PUBLICATIONS

Cha et al., "An Identity-Based Signature from Gap Diffie-Hellman Groups", 2002, PCK 2003, LNCS 2567, Springer-Verlag, pp. 18-30.*

(Continued)

*Primary Examiner*—Kambiz Zand
*Assistant Examiner*—William S Powers
(74) *Attorney, Agent, or Firm*—Haynes and Boone, LLP; Michael Shenker

(57) ABSTRACT

Methods and systems are provided for generating and verifying signatures of digital messages communicated between signers and verifiers. Using bilinear mappings, such as Weil or Tate pairings, these methods and systems enable generation and verification of efficient multisignatures, identity-based ring signatures, hierarchical proxy signatures, and hierarchical online/offline signatures.

44 Claims, 6 Drawing Sheets

U.S. PATENT DOCUMENTS

| | | | |
|---|---|---|---|
| 7,088,822 | B2 | 8/2006 | Asano |
| 7,113,594 | B2 | 9/2006 | Boneh et al. |
| 7,178,025 | B2 | 2/2007 | Scheidt et al. |
| 7,224,804 | B2 | 5/2007 | Ishiguro et al. |
| 7,225,339 | B2 | 5/2007 | Asano et al. |
| 2002/0025034 | A1 | 2/2002 | Solinas |
| 2002/0025475 | A1 | 2/2002 | Matsumoto |
| 2002/0136401 | A1 | 9/2002 | Hoffstein et al. |
| 2002/0154782 | A1 | 10/2002 | Chow et al. |
| 2003/0081785 | A1 | 5/2003 | Boneh et al. |
| 2003/0095665 | A1 | 5/2003 | Wheeler et al. |
| 2003/0097562 | A1 | 5/2003 | Wheeler et al. |
| 2003/0097569 | A1 | 5/2003 | Wheeler et al. |
| 2003/0179885 | A1 | 9/2003 | Gentry et al. |
| 2005/0005126 | A1* | 1/2005 | Zhang et al. ................ 713/176 |
| 2005/0246533 | A1 | 11/2005 | Gentry et al. |
| 2008/0178005 | A1 | 7/2008 | Gentry |
| 2008/0313465 | A1 | 12/2008 | Gentry |

FOREIGN PATENT DOCUMENTS

| | | |
|---|---|---|
| JP | 2000-137435 | 5/2000 |
| JP | 2000-148012 | 5/2000 |

OTHER PUBLICATIONS

Zhang et al., "ID-Based Blind Signature and Ring Signature from Pairings", ASIACRYPT 2002, LNCS 2501, Springer-Verlag, pp. 533-547.*

Boneh et al., "Identity-Based Encryption form the Weil Pairing", CRYPTO 2001, LNCS 2139, Springer-Verlag, pp. 213-229.*

Zhang et al., "New Proxy Signature, Proxy Blind Signature and Proxy Ring Signature Schemes from Bilinear Pairings", Information Security and Privacy, ACISP 2003, pp. 1-11.*

Zhang, Jianhong "An Efficient Identity-Based Ring Signature Scheme and Its Extension" Computational Science and its Applications—ICCSA 2007 Lecture Notes in Computer Science; Springer Berlin Heidelberg, BE, vol. 4706, 1900, pp. 63-74, XP019068364, ISBN: 978-3-540-74475-7.

Boneh, Dan et al. "Short Signatures from the Weil Pairing" Asiacrypt 2001, vol. 17, No. 4, Dec. 9, 2001, pp. 297-319, XP001221154, ISSN: 0933-2790.

Boneh, Dan et al. "Identity-Based Encryption from the Weil Pairing" Advances in Cryptology, Crypto 2001 $21^{st}$ Annual International Cryptology Conference, Santa Barbara, CA, Aug. 19-23, 2001, Proceedings Lecture Notes in Computer Science; vol. 2139, Berlin: Springer, DE, Aug. 19, 2001 (pp. 213-229, XP000988703; ISBN: 3-540-42456-3.

Shamir, Adi "Identity-Based Cryptosystems and Signature Schemes" Lecture Notes in Computer Science, Springer Verlag, Berlin, DE, 1985, pp. 47-53, XP000675444; ISSN: 0302-9743.

Partial European Search Report for EP Application No. EP 08 10 1261, dated Apr. 4, 2008, 7 pages.

Extended European Search Report for EP Application No. EP 08101263.5, dated 27 Jun. 2008, 8 pages.

Gentry, Craig and Silverberg, Alice "Hierarchical ID-Based Cryptography" Lecture Notes in Computer Science, Springer Verlag, Berlin, Germany, vol. 2501, May 14, 2002, pp. 548-566, XP002396667.

Hess, F. "Exponent Group Signature Schemes and Efficient Identity Based Signature Schemes Based on Pairings" [online] Jan. 29, 2002, pp. 1-16, XP002484199.

Paterson, Kenneth G. "ID-Based Signatures From Pairings of Elliptic Curves" [online] Jan. 22, 2002, pp. 1-4, XP002484200.

Cha, Jae Choon; Cheon, Jung Hee "An Identity-Based Signature from Gap Diffie-Hellman Groups" Public Key Cryptography—PKC 2003. $6^{th}$ International Workshop on Practice and Theory in Public Key Cryptography Proceedings (Lecture Notes in Computer Science vol. 2567) Springer Verlag Berlin, Germany, Feb. 15, 2002, pp. 1-13, XP002418187.

Boneh, Dan; Franklin, Matt "Identity-Based Encryption from the Weil Pairing" Advances in Cryptology. Crypto 2001. $21^{st}$ Annual Cryptology Conference, Santa Barbara, CA Aug. 19-23, 2001. Proceedings, Lecture Notes in Computer Science; vol. 2139 Berlin, Germany, Springer Verlag, pp. 213-229, XP 000988703.

Shamir, Adi; Tauman, Yael "Improved Online/Offline Signatures Schemes" Advances in Cryptology. Crypto 2001. $21^{st}$ Annual International Cryptology Conference, Santa Barbara, CA Aug. 19-23, 2001, pp. 355-367, XP000988709.

Extended European Search Report for EP Application No. EP 08101262.7, dated Jun. 23, 2008, 11 pages.

Hwang, Min-Shiang et al. "A Secure Nonrepudibable Threshold Proxy Signature Scheme With Known Signers," Informatica, 2000, vol. 11, No. 2, pp. 137-144, XP-002483305.

Zhang, Kan "Threshold Proxy Signature Schemes," Information Security, International Workshop, Sep. 17, 1997, pp. 282-290, XP-008019402.

Mambo, Masahiro et al. "Proxy Signatures: Delegation of the Power to Sign Messages," IEICE Transactions on Fundamentals of Electronics, Communications and Computer Sciences, Engineering Sciences Society, Tokyo, JP, vol. E79-A, No. 9, Sep. 1, 1996, pp. 1338-1353, XP000679624.

English Translation of Office Action Issued by the Japanese Patent and Trademark Office for Japanese Patent Application Serial No. 2003-857078, drafted Aug. 24, 2009, 4 pages.

English Translation of JP 2000-137435, 34 pages.

"Short 1-out-of-n Proofs—Ring Signatures based on DLP," SCIS 2002, The 2002 Symposium on Cryptography and Information Security, Shirahama, Japan, Jan. 29-Feb. 1, 2002, The Institute of Electronics, Information and Communication Engineers, 7 pages.

Sakai, Ryuichi et al., "Group Signature with Weil and Tate Parings" Technical Report of IEICE, Mar. 2002, pp. 105-108.

Okazaki, Hiroyuki et al. "A Group Signature Scheme With Pairing Over Elliptic Curves", SCIS 2002, The 2002 Symposium on Cryptography and Information Security, Shirahama, Japan, Jan. 29-Feb. 1, 2002, The Institute of Electronics, Information and Communication Engineers, 6 pages.

Harn, L. "Digital Multisignature with Distinguished Signing Authorities" Electronics Letters, Feb. 18, 1999, vol. 35, No. 4, pp. 294-295.

Boyd, "Multisignatures Based on Zero Knowledge Schemes," Electronic Letters, Oct. 1991, Fol. 27, No. 22, pp. 1-3.

Mambo et al. "Proxy Signatures for Delegating Signing Operation" New Delhi, India, 1996 ACM 0-89791-829-0/96/03, XP 000620977, pp. 48-61.

Kim, Seungjoo et al. "Proxy Signatures, Revisited" XP008019403, Nov. 11, 1997, pp. 223-232.

Lee, Byoungcheon et al. "Strong Proxy Signature and its Applications" SCIS 2001, The 2001 Symposium on Cryptography and Information Security, Oiso, Japan, Jan. 23-26, 2001, The Institute of Electronics, Information and Communication Engineers, XP-002418188.

Shamir, Adi et al. "Improved Online/Offline Signature Schemes" J. Kilian (Ed.): Crypto 2001, LNCS 2139, 2001, XP-000988709, pp. 355-367.

Peterson, Holger et al. "Self-Certified Keys—Concepts and Applications" Communications and Multimedia Security vol. 3, Sep. 1997, XP-000828383, pp. 102-116.

Rivest, Ronald L. et al. "How to Leak a Secret," Jun. 4, 2001, XP-002270009, pp. 1-13.

Shoup, Victor "Practical Threshold Signatures" Eurocrypt 2000, LNCS 1807, Springer-Verlag Berlin Heidelberg 2000, XP-000896061, pp. 207-220.

Abdalla, Michel et al. "Forward Security in Threshold Signature Schemes" XP-002396310, Jun. 16, 2000, pp. 1-17.

Herranz, Javier et al. "Fully Distributed Proxy Signature Schemes" XP002418189, Cryptology ePrint Archive: Report 2002/051, Sep. 2, 2007, pp. 1-12.

Okamoto, "A Digital Multisignature Scheme Using Bijective Public Key Crptosystems," ACM Transactions on Computer Systems, Vo. 6, No. 8, Nov. 1992, pp. 432-441.

Sakai, Ryuichi et al., "Crypt schemes based on Weil Pairing," pp. 1-12.

Dutta, Ratna et al. "Pairing-Based Cryptographic Protocols: A Survey" Cryptographic Research Group. 2004.

Gentry, Craig and Silverberg, Alice: "Hierarchical ID-Based Cryptography," May 24, 2002, pp. 1-21, XP002396667.

N. Koblitz, *Elliptic Curve Cryptosystems*, Mathematics of Computation, vol. 48, No. 177, Jan. 1987, pp. 203-209.

Y. Dodis, M. Yung, *Exposure-Resilience for Free: The Hierarchical ID-Based Encryption Case*.

U. Feige, A. Fiat, A. Shamir, *Zero Knowledge Proofs of Identity*, 1987 ACM 0-89791-22 7/87/0006-0210, pp. 210-217.

S. S. Al-Riyami, K. G. Paterson, *Authenticated Three Party Key Agreement Protocols From Pairings*, 2002.

C. G. Gunther, A. B. Boveri, *An Identify-Based Key-Exchange Protocol*, pp. 29-37.

A. Fiat, A. Shamir, *How to Prove Yourself: Practical Solutions to Identification and Signature Problems*, 1998, pp. 186-194.

J.C. Cha and J.H. Cheon, *An Identity-Based Signature from Gap Diffie-Hellman Groups*, Cryptology ePrint archive, Report 2002/018, 2002. http://eprint.iacr.org/.

N. P. Smart, *An Identity-Based Authenticated Key Agreement Protocol Based on the Weil Pairing*, Cryptology Eprint Archive, Report 2001/111,2001. http://eprint.iacr.org/.

D. Boneh, M. Franklin, *Identity-Based Encryption from the Weil Pairing*, Advances in Crytology—CRYPTO2001, Springer LNCS 2139.

C. Cocks, *An Identity Based Encryption Scheme Based on Quadratic Equations*.

J. Horwitz, B. Lynn, *Toward Hierarchical Identity-Based Encryption*.

M. Girault, *Self-Certified Public Keys*, 1998, pp. 490-497.

L.C. Guillou, J. Quisquater, *A Practical Zero-Knowledge Protocol Fitted Security Microprocessor Minimizing Both Transmission and Memory*, Advances in Cryptology—EUROCRYPT'88, Lect. Notes in Computer Science, vol. 330, pp. 123-128, Springer Verlag (1988).

R. Blom, *An Optimal Class of Symmetric Key Generation Systems*, 1998, pp. 336-338.

C. Blundo, A. De Santis, A. Herzberg, S. Kutten, U. Vaccaro, M. Yung, *Perfectly-Secure Key Distribution for Dynamic Conferences*, 1998, Springer-Verlag, pp. 471-486.

F. Hess, *Exponent Group Signature Schemes and Efficient Identity Based Signature Schemes based on Pairings*, Cryptology Eprint Archive, Report 2002/012, 2002. http://eprrint.iacr.org/.

K. Rubin, A. Silverberg, *Supersingular Abelian Varieties in Cryptology*.

W.Diffie, M. E. Hellman, *New Directions in Cryptography*, pp. 29-40.

A. Menezes, P. van Oorschot, S. Vanstone, *Chapter 12 Key Establishment Protocols*, Handbook of Applied Cryptography, 1997, pp. 489-541.

V.S. Miller, *Use of Elliptic Curves in Cryptography*, 1998, pp. 417-426.

D. Boneh, B. Lynn, H. Shacham, *Short Signatures from the Weil Pairing*, Advances in Cryptology: Asiacrypt 2001 (LNCS 2248), pp. 514-532, 2001.

E. Fujisaki, T. Okamoto, *Secure Integration of Asymmetric and Symmetric Encryption Schemes*, Michael Wiener (Ed.): CRYPTO'99, LNCS 1666, pp. 537-554, 1999.

A. Shamir, *Identity-Based Cryptosystems and Signature Schemes*, 1998, Springer-Verlag, pp. 46-53.

U. Maurer, Y. Yacobi, *A Remark on a Non-Interactive Public-Key Distribution System*, 1998.

G. Hanaoka, T. Nishioka, Y. Zheng, H. Imai, *A Hierarchical Non-interactive Key-Sharing Scheme with Low Memory Size and High Resistance Against Collusion Attacks*, The Computer Journal, vol. 45, No. 3, 2002.

G. Hanaoka, T. Nishioka, Y. Zheng, H. Imai, *An Efficient Hierarchical Identity-Based Key-Sharing Method Resistant Against Collusion-Attacks*, JSPS-REFT 96P00604, pp. 348-362.

A. Joux, A One Round Protocol for Tripartite Diffie-Hellman, W. Bosma (Ed.), ANTS-IV, LNCS 1838, pp. 385-393, 2000.

Sakai, Ryuichi et al., "Cryptosystems Based on Pairing", The 2000 Symposium on Cryptography and Information Security, Okinawa, Japan, Jan. 26-28, 2000, SCIS2000—C20.

Sakai, Ryuichi et al., "Cryptosystems Based on Pairing over Elliptic Curve", The 2001 Symposium on Cryptography and Information Security, Oiso, Japan, Jan. 23-26, 2001, The Institute of Electronics, Information and Communication Engineers.

Office Action dated Mar. 10, 2010 in U.S. Appl. No. 11/955,167, 25 pages.

Shamir et al., "Improved Online/Offline Signature Schemes," 2001, CRYPTO 2001 LNCS 2139, Springer-Verlag, pp. 355-367.

Krawczyk et al., "Chameloen Signatures," Proceedings of NDSS, 2000, pp. 1-12.

\* cited by examiner

SIGNATURE SCHEMES USING BILINEAR MAPPINGS

RELATED APPLICATIONS

The present application is a division of U.S. patent application No. 10/499,853, which entered national stage under 35 U.S.C. 371(c) on Jun. 21, 2004 now U.S. Pat. No. 7,533,270, and which is a U.S. national stage of PCT patent application no. PCT/US2003/011821, having the international filing date of 15 Apr. 2003, incorporated herein by reference, which claims priority under 35 U.S.C. §119(e) to provisional U.S. patent application No. 60/372,668, filed on Apr. 15, 2002, which is incorporated herein by reference.

FIELD OF THE INVENTION

The present invention relates in general to cryptography and secure communication via computer networks or via other types of systems and devices, and more particularly to schemes for generating and verifying signatures of communications in systems using public key cryptography.

BACKGROUND ART

Generally speaking, in systems using public key cryptography, each party is associated with both a private and a public key. The public keys are known publicly, or are available from a Certificate Authority. To sign a message, a signer uses its private key. Because the signer's private and public keys are related, a verifier may then verify the signature using the signer's public key. Because the signer's private key is known only to the signer (and perhaps to a private key generator, or PKG), third parties are not able to forge the signer's signature.

The various embodiments of the present invention also are compatible with identity-based signature schemes. Roughly speaking, identity-based signature schemes are public key schemes in which the public key of an entity is derived from information associated with the entity's identity. For instance, the identity information may be personal information (i.e., name, address, email address, etc.), or computer information (i.e., IP address, etc.). In addition, identity information may include not only information that is strictly related to an entity's identity, but also widely available information such as the time or date. That is, the importance of the concept of identity information is not its strict relation to the entity's identity, but that the information is readily available to anyone who wishes to encrypt a message to the entity.

An entity's private key in an identity-based system using public key cryptography is generated and distributed by a trusted party or logical process, typically known as a private key generator ("PKG"). The PKG uses a master secret to generate private keys. Because an entity's public key may be derived from its identity, when Bob wants to verify a signature from Alice, he does not need to retrieve Alice's public key from a database. Instead, Bob merely derives the key directly from Alice's identifying information. Databases of public keys are unnecessary. Certificate authorities ("CAs") also are unnecessary. There is no need to "bind" Alice's identity to his public key because his identity is his public key.

The concept of identity-based systems is not new. It was proposed in A. Shamir, *Identity-Based Cryptosystems and Signatures Schemes*, ADVANCES IN CRYPTOGRAPHY—CRYPTO '84, Lecture Notes in Computer Science 196 (1984), Springer, 47-53. However, practical identity-based signature schemes have not been found until recently.

Public key and identity-based systems have been further expanded by incorporating a hierarchical structure. For instance, identity-based schemes involve a hierarchy of logical or actual PKGs. A root PKG may issue private keys to other PKGs, who in turn may issue private keys to users in particular domains. This enables a verifier to verify a signature from a signer without an online lookup of the signer's public key or lower-level public parameters, even if the verifier is not in the system at all, as long as the verifier obtained the public parameters of the root PKG. Another advantage of a hierarchical identity-based signature scheme is damage control. For instance, disclosure of a domain PKG's secret would not compromise the secrets of higher-level PKGs, or of any other PKGs that are not direct descendents of the compromised domain PKG.

Although known public key and identity-based systems have provided schemes for generating and verifying digital signatures, the known signature schemes have had significant shortcomings. For instance, multisignature schemes have not enabled multiple signers to sign multiple documents. A multisignature scheme that enabled multiple signers to sign multiple documents would increase the efficiency of the signature even further. For instance, such a multisignature could be used to compress a certificate chain. Accordingly, there is a need for a signature scheme that allows multiple signers to sign multiple documents together.

There also is a need for ring signature schemes for identity-based systems using public key cryptography. Ring signatures were recently introduced in R. Rivest, A. Shamir, Y. Tauman, *How to Leak a Secret*, ADVANCES IN CRYPTOLOGY—ASIACRYPT 2001, Lecture Notes in Computer Science 2248 (2001), Spring, 552. Ring signatures enable a member of a group (not necessarily established a prion) to sign a message such that a third party can verify that some member of the group created the signature but cannot determine which member. However, efficient ring signature schemes have not been available for identity-based encryption schemes. Accordingly, there is a need for identity-based ring signature schemes.

There also is a need for proxy signatures, proxy decryption, delegation, and electronic voting in hierarchical identity-based systems using public key cryptography. Such features were proposed for non-hierarchical systems in P. Horster, H. Petersen, *Self-Certified Keys—Concepts and Applications*, PROC. 3 OF CONF. ON COMMUNICATIONS AND MULTIMEDIA SECURITY, 1997. However, these features have not been available for hierarchical systems. Accordingly, there is a need for hierarchical identity-based signature schemes that enable proxy signatures, proxy decryption, delegation, and electronic voting.

There also is a need for more efficient hierarchical identity-based signature schemes that enable a portion of the signature to be generated offline. For many applications, the online signing time is more important than the total signing time. In these cases, the efficiency of the scheme can be increased by enabling more of the signature and verification algorithms to be performed offline. Online/offline signature schemes were proposed in A. Shamir, Y. Tauman, *Improved Online/Offline Signature Schemes*, ADVANCES IN CRYPTOLOGY—CRYPTO 2001, Lecture Notes in Computer Science 2139 (2001), Springer, 355-367. However, online/offline signature schemes have not been available for hierarchical identity-based systems. Accordingly, there is a need for efficient online/offline hierarchical identity-based signature schemes.

It is therefore an object of the present invention to provide a multisignature scheme that allows multiple signers to sign multiple documents. It is another object of the present invention to provide an identity-based ring signature scheme. It is a further object of the present invention to provide a hierarchical identity-based signature scheme that enables proxy signatures, proxy detection, delegation, and electronic voting. It is a still further object of the present invention to provide an efficient online/offline hierarchical identity-based signature scheme.

DISCLOSURE OF THE INVENTION

In accordance with the present invention, methods are provided for implementing secure, practical, and efficient signature schemes.

According to one aspect of the present invention, methods and systems are provided for generating and verifying a digital signature of digital messages communicated between signers and verifiers. According to these methods and schemes, each signer signs a subset of the messages, and the subset signed by a at least one signer is different from the subset signed by at least one other signer. A private key is selected for each of the signers and a message function value is generated for each of the messages using a predetermined function. One or more signature components are generated for each of the signers using at least the private key associated with each signer and the message function value associated with the message to be signed. A digital signature is generated using each of the signature components. The digital signature is then verified using at least the message function values.

According to another aspect of the present invention, methods and systems are provided for generating and verifying a digital signature of a digital message communicated between a signer and a verifier, wherein the signer is one of a plurality of members of a set. The signer is associated with an identity, and the other members of the set also are associated with identities. First and second cyclic group of elements are generated, and a bilinear, non-degenerate pairing is selected that is capable of generating an element of the second cyclic group from two elements of the first cyclic group. First and second generators of the first cyclic group are selected, as is a function capable of generating an element of the first cyclic group from a string of binary digits. Public points are generated for each of the members of the set, and a private point is generated for the signer. The digital message is signed by generating the digital signature using at least the signer's private point and the public point of each of the members of the set. Using at least the public point of each of the members of the set, the signature is verified to have been generated by a member of the set.

According to yet another aspect of the present invention, methods and systems are provided for generating and verifying a proxy signature of a digital message communicated between a proxy signer and a verifier, wherein the message is signed by the proxy signer on behalf of an original signer. An original signer private key and an original signer public key, both associated with the original signer, are selected. A proxy signer private key and a proxy signer public key, both associated with the proxy signer, also are selected. A proxy private key is then generated using the original signer private key and the proxy signer public key. A message function value is generated using a predetermined function, and the proxy signature is generated using at least the message function value, the proxy private key, and the proxy signer public key. The proxy signature may be verified using at least the original signer public key, the proxy signer public key, and the message function value.

According to still another aspect of the present invention, methods and systems are provided for generating and verifying a signature of a digital message communicated between a signer and a verifier. The signer is t levels below a root PKG in a hierarchical system. The signer is associated with an ID-tuple that includes identity information associated with the signer and with each of the t–1 lower-level PKGs in the hierarchy between the root PKG and the signer. A lower-level public key is generated for each of the lower-level PKGs. A signer private key associated with the signer is generated. In an offline mode, a random signer trapdoor secret, a random message, and a random number are selected. An offline signature is then generated using the random message, the random number, the trapdoor secret, the signer private key, and the lower-level public keys associated with the t–1 lower-level PKGs. In an online mode, a matching random number is determined such that the matching random number matches the offline signature with the message to be signed. The offline signature may then be verified using the matching random number.

BRIEF DESCRIPTION OF THE DRAWINGS

The subsequent description of the preferred embodiments of the present invention refers to the attached drawings, wherein.

MODE(S) FOR CARRYING OUT THE INVENTION

Figure 1:
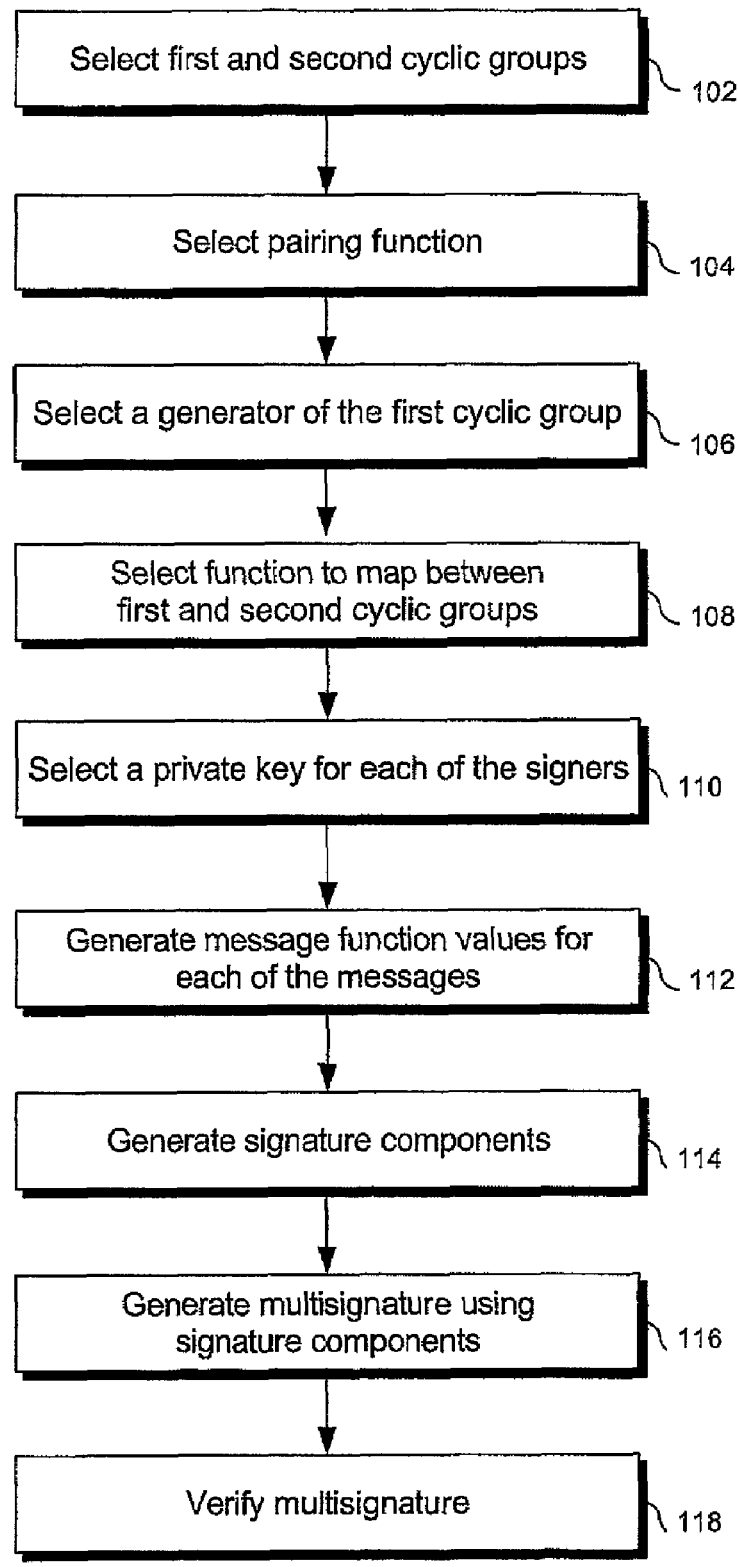
FIG. 1 shows a flow diagram illustrating a method of generating and verifying a multisignature Sig of a digital message M according to one presently preferred embodiment of the invention.

The presently preferred methods of the invention provide secure, practical, and efficient public key, identity-based, and hierarchical signature schemes.

The present invention provides public key signature schemes. These include both identity-based schemes and non-identity-based schemes. They also include both hierarchical and non-hierarchical schemes.

Each of the hierarchical identity-based signature schemes of the present invention requires a hierarchical structure of PKGs, including at least one root PKG and a plurality of lower-level PKGs. The hierarchy and the lower-level PKGs may be logical or actual. For instance, a single entity may generate both a root key generation secret and the lower-level key generation secrets from which lower-level users' encryption or signature keys are generated. In this case, the lower-level PKGs are not separate entities, but are merely processes or information arranged in a logical hierarchy and used to generate keys for descendent PKGs and users in the hierarchy. Alternatively, each lower-level PKG may be a separate entity. Another alternative involves a hybrid of actual and logical lower-level PKGs. For purposes of this disclosure, the term "lower-level PKG" will be used generically to refer to any of these alternatives.

In the context of the hierarchical identity-based systems disclosed herein, identity-based public keys may be based on time periods. For instance, a particular signer's identity may change with each succeeding time period. Alternatively, a signer may arrange the time periods as children or descendents of itself in a hierarchy, and a verifier would use the identity of the proper time period when verifying the signature. Either way, each key may be valid for signing messages only during the associated time period.

The hierarchical identity-based schemes of the present invention generally include five algorithms: Root Setup, Lower-level Setup, Extraction, Signing, and Verification. Three of these algorithms rely upon the identities of the relevant entities in the hierarchy. Each user preferably has a position in the hierarchy that may be defined by its tuple of IDs: $(ID_1, \ldots, ID_t)$. The user's ancestors in the hierarchy are the root PKG and the users, or PKGs, whose ID-tuples are $\{(ID_1, \ldots, ID_i): 1 \leq i \leq (t-1)\}$. The ID-tuples preferably are represented as binary strings for purposes of computations.

In the Root Setup algorithm, the root PKG uses a security parameter k to generate public system parameters params and a root key generation secret. The system parameters include a description of the message space $\mathcal{M}$ and the signature space S. The system parameters will be publicly available, while only the root PKG will know the root key generation secret.

In the Lower-level Setup algorithm, each lower-level PKG preferably generates its own lower-level key generation secret for purposes of extraction. Alternatively, a lower-level PKG may generate random one-time secrets for each extraction.

In the Extraction algorithm, a PKG (whether the root PKG or a lower-level PKG) generates a private key for any of its children. The private key is generated using the system parameters, the generating PKG's private key, and any other preferred secret information.

In the Signing algorithm, the signer of a digital message signs the message $M \in \mathcal{M}$ to generate a signature $Sig \in S$ using params and the signer's private key d. In the Verification algorithm, the verifier of the signed message verifies the signature Sig using params and the ID-tuple of the signer. The Verification algorithm preferably outputs "valid" or "invalid". Signing and Verification also preferably satisfies a consistency constraint:

$\forall M \in \mathcal{M}$: Verification(params,ID-tuple,Sig)="valid"

where Sig=Signing(params, d, M).

Pairings

The presently preferred signature schemes of the present invention are based on pairings, such as, for instance, the Weil or Tate pairings associated with elliptic curves or abelian varieties. The signature schemes also are based on the Diffie-Hellman Problem or the Bilinear Diffie-Hellman Problem. In either case, the schemes use two cyclic groups $\mathbb{G}_1$ and $\mathbb{G}_1$, preferably of the same large prime order q. The first group $\mathbb{G}_1$ preferably is a group of points on an elliptic curve or abelian variety, and the group law on $\mathbb{G}_1$ may be written additively. The second group $\mathbb{G}_1$ preferably is a multiplicative subgroup of a finite field, and the group law on $\mathbb{G}_1$ may be written multiplicatively. However, other types of groups may be used as $\mathbb{G}_1$ and $\mathbb{G}_1$ consistent with the present invention.

The methods also use a generator $P_0$ of the first group $\mathbb{G}_1$. In addition, a pairing or function $\hat{e}: \mathbb{G}_1 \times \mathbb{G}_1 \to \mathbb{G}_1$ is provided for mapping two elements of the first group $\mathbb{G}_1$ to one element of the second group $\mathbb{G}_1$. The function e preferably satisfies three conditions. First, the function e preferably is bilinear, such that if Q and R are in $\mathbb{G}_1$ and a and b are integers, then $e(aQ, bR) = e(Q, R)^{ab}$. Second, the function e preferably is non-degenerate, such that the map does not send all pairs in $\mathbb{G}_1 \times \mathbb{G}_1$ to the identity in $\mathbb{G}_1$. Third, the function e preferably is efficiently computable. A function e satisfying these three conditions is considered to be admissible.

The function e also preferably is symmetric, such that $e(Q, R) = e(R, Q)$ for all $Q, R \in \mathbb{G}_1$. Symmetry, however, follows immediately from the bilinearity and the fact that $\mathbb{G}_1$ is a cyclic group. Weil and Tate pairings associated with supersingular elliptic curves or abelian varieties can be modified to create such bilinear maps according to methods known in the art. However, even though reference to elements of the first cyclic group $\mathbb{G}_1$ as "points" may suggest that the function e is a modified Weil or Tate pairing, it should be noted that any admissible pairing e will work.

The security of the signature schemes of the present invention is based primarily on the difficulty of the Diffie-Hellman Problem or the Bilinear Diffie-Hellman Problem. The Diffie-Hellman Problem is that of finding abP given a randomly chosen $P \in \mathbb{G}_1$, as well as aP and bP (for unknown randomly chosen a, b, c $\in \mathbb{Z}/q\mathbb{Z}$). The Bilinear Diffie-Hellman problem is that of finding $\hat{e}(P, P)^{abc}$ given a randomly chosen $P \in \mathbb{G}_1$, as well as aP, bP, and cP (for unknown randomly chosen a, b, c $\in \mathbb{Z}/q\mathbb{Z}$)). Solving the Diffie-Hellman problem in $\mathbb{G}_1$ solves the Bilinear Diffie-Hellman problem because $e(P, P)^{abc} = e(abP, cP)$. Similarly, solving the Diffie-Hellman problem in $\mathbb{G}_1$ solves the Bilinear Diffie-Hellman problem because, if $g = e(P, P)$, then $g^{abc} = (g^{ab})^c$ where $g^{ab} = e(aP, bP)$ and $g^c = e(P, cP)$. For the Bilinear Diffie-Hellman problem to be hard, $\mathbb{G}_1$ and $\mathbb{G}_1$ should be chosen such that there is no known algorithm for efficiently solving the Diffie-Hellman problem in either $\mathbb{G}_1$ or $\mathbb{G}_1$. If the Bilinear Diffie-Hellman problem is hard for a pairing $\hat{e}$, then it follows that $\hat{e}$ is non-degenerate.

A randomized algorithm $\mathcal{IG}$ is a Bilinear Diffie-Hellman generator if $\mathcal{IG}$ takes a security parameter k>0, runs in time polynomial in k, and outputs the description of two groups $\mathbb{G}_1$ and $\mathbb{G}_1$, preferably of the same prime order q, and the description of an admissible pairing e: $\mathbb{G}_1 \times \mathbb{G}_1 \to \mathbb{G}_1$. If $\mathcal{IG}$ is a Bilinear Diffie-Hellman parameter generator, the advantage Adv $\mathcal{IG}(\beta)$ that an algorithm $\beta$ has in solving the Bilinear Diffie-Hellman problem is defined to be the probability that the algorithm $\beta$ outputs $e(P, P)^{abc}$ when the inputs to the algorithm are $\mathbb{G}_1, \mathbb{G}_2, e, P, aP, bP,$ and cP, where ($\mathbb{G}_1, \mathbb{G}_1, \hat{e}$) is the output of $\mathcal{IG}$ for a sufficiently large security parameter k, P is a random generator of $\mathbb{G}_1$ and a, b, and c are random elements of $\mathbb{Z}/q\mathbb{Z}$) The assumption underlying the Bilinear Diffie-Hellman problem is that Adv $\mathcal{IG}(\beta)$ is negligible for all efficient algorithms $\beta$. A similar assumption underlies the Diffie-Hellman Problem.

Multisignatures

As described above, a multisignature scheme is any scheme that allows several signers to sign a document (or documents) in a way that is somehow more efficient than if they each signed the document separately. Usually, this enhanced efficiency is in terms of signature length—i.e., the combined multisignature of n signers is shorter than n separate signatures. This is convenient for transactions that require one of the parties to acquire pre-approval from multiple sources and forward this multiple pre-approval prior to the transaction. As described above, until now, there has not been a multisignature scheme that enabled multiple signers to efficiently sign multiple documents. For instance, in existing multisignature schemes, the length of the multisignature is dependent at least upon the number of signers or the number of documents signed. The present invention provides more efficient multisignature signature schemes that enable multiple signers to sign multiple documents to generate a multisignature having a length that is independent of both the number of signers and the number of documents.

Referring now to the accompanying drawings, FIG. 1 shows a flow diagram illustrating a method of generating and verifying a multisignature according to one presently preferred embodiment of the invention. Using bilinear mappings, such as Weil or Tate pairings, this embodiment enables multiple signers to sign multiple documents. The resulting signature may be represented as a single element of a group, such as a single point on an elliptic curve, regardless of the number of different signers or the number of different documents signed.

The multisignature scheme described with reference to FIG. 1 allows n signers to sign m digital messages and generate a single multisignature. Each signer signs a subset of the m messages. Unlike previous signature schemes, the present scheme enables different signers to sign different sets of messages without sacrificing efficiency. The method begins in block 102 by generating first and second cyclic groups $\mathbb{G}_1$ and $\mathbb{G}_1$ of elements. In block 104, a function e is selected, such that the function e is capable of generating an element of the second cyclic group $\mathbb{G}_1$ from two elements of the first cyclic group $\mathbb{G}_1$. The function e preferably is an admissible pairing, as described above. A generator P of the first cyclic group $\mathbb{G}_1$ is selected in block 106. In block 108, a function H is selected such that H is capable of generating an element of the first cyclic group $\mathbb{G}_1$ from a first string of binary digits. For instance, the function H may be a hash function.

In block 110, a private key $s_i$ is selected for each of the n signers. Using the function H, message function values $P_{M_j}$ are generated for each of the m messages in block 112. Signature components $S_{ij}$ are generated in block 114, using the formula $S_{ij}=s_i P_{M_j}$ for all $(i,j) \in C$—that is, for all (ij) pairs such that the ith signer signed the jth message. These signature components $S_{ij}$ are combined to generate the digital signature $Sig=\Sigma_{(i,j)\in C} S_{ij}$, as shown in block 116. The efficiency of the signature scheme flows from the fact that the digital signature Sig comprises a single element of the first cyclic group $\mathbb{G}_1$. This signature is verified in block 118 by confirming that $e(P,Sig)=\prod_{(i,j)\in C} e(s_i P, P_{M_j})$.

Although the scheme above, in which every signer signs every message, is a useful type of multisignature, there are other variations. For instance, not all of the messages need be signed by all of the signers. In addition, the various signatures and authorizations that the party has obtained can be matched in different combinations in future transactions. If several signers sign the same message or one signer signs multiple messages, multisignature verification efficiency is improved because fewer pairing computations need to be made. This scheme can be made even more bandwidth efficient by sending only the x coordinate of the signature Sig, from which the verifier can recover the y coordinate, according to methods known in the art.

Additional security measures may be useful to prevent a particular type of attack on the multisignature scheme described with reference to FIG. 1. In such an attack, the attacker modifies its public key/private key pair depending on some other party's public key so that the attacker can forge, without the other party's participation, a single-message multisignature with itself and the other party as the putative signers. This type of attack may be prevented in a number of ways. For instance, a single party may collect the signature components from each of the signers to form the multisignature. In doing so, this party may independently verify each signer's signature component $S_{ij}$ by confirming that $e(P,S_{ij})=e(s_i P, P_{M_j})$. The ultimate verifier of the multisignature, however, may not be reassured by this approach because the verifier still has to trust that the party that collected the signature components verified those signature components correctly.

Alternatively, the attack can be thwarted by requiring each signer to individually sign some message that is unique to the signer, such as, for instance, a message that contains the signer's identity information or public key, or a message that is randomly chosen for each signer. For example, $P_{M_{ij}}$ may be set to $H(s_i P, M_j)$. Or, the CA may require the signer to sign some "challenge" message chosen by the CA before it issues a certificate to the signer. (In fact, CAs often require this already.) In either case, the verifier is able to independently verify the multisignature without any reassurance from the party that collected the signature components. Those skilled in the art will appreciate that other methods also may be used to thwart the attack.

Identity-Based Ring Signatures

Ring signatures enable a member of a group (not necessarily established a priori) to sign a message such that a third party can verify that some member of the group created the signature but cannot determine which member. For example, consider a cabinet member who wants to leak a secret to the press; but wants to maintain limited anonymity—i.e., he wants the press to know that he is a cabinet member, but not which member. Ring signatures allow a signer to choose any set containing the signer, and to prove that the signer is a member of that set without disclosing which member. Thus, a cabinet member may use his private key in combination with the public keys of the other cabinet members to create a ring signature for the cabinet. Because the cabinet-specific ring signature could only be created by a cabinet member, the press can use this signature to prove the authenticity of its anonymous source.

Ring signatures also may be useful in contract negotiations. When party A sends a draft contract to party B, party A may wish to provide authentication but not nonrepudiation—i.e., it may want to prove to party B that the draft contract came from party A, but it may not want to give party B the ability to prove to a third party (i.e., a court) that party A signed the draft. In this situation, party A can create a ring signature for the set {A, B}. Party B will know that party A created the signature because party B did not create the signature itself. On the other hand, party B will not be able to convince third parties that party A created the signature because, from the perspective of third parties, party B also could have created the signature.

Figure 2:
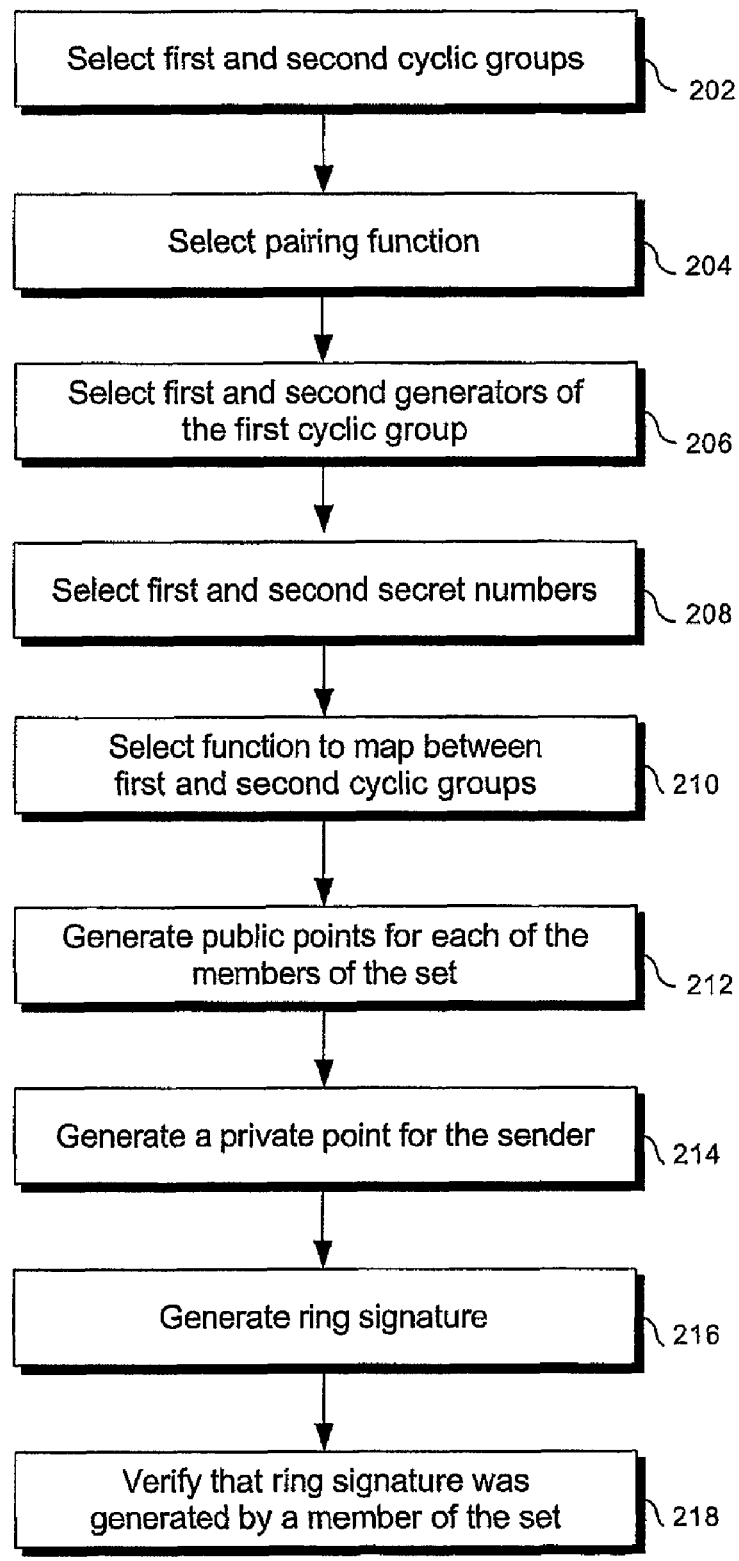
FIG. 2 shows a shows a flow diagram illustrating a method of generating and verifying a ring signature Sig of a digital message M communicated between a signer and a verifier according to another presently preferred embodiment of the invention.

An identity-based ring signature scheme will now be discussed with reference to FIG. 2, which shows a flow diagram illustrating a method of generating and verifying a digital signature Sig of a message M communicated between a signer and a verifier according to another presently preferred embodiment of the invention. The signer in this case is one of t members of a set. For purposes of following description, the signer is associated with identity $ID_1$, and the other members of the set are associated with identities $ID_i$ for $2 \leq i \leq t$. Note, however, that if the anonymous signer always were associated with the first listed identity, the signature would not actually be anonymous.

The method begins in block 202 by generating first and second cyclic groups $\mathbb{G}_1$ and $\mathbb{G}_1$ of elements. In block 204, a function e is selected, such that the function e is capable of generating an element of the second cyclic group $\mathbb{G}_1$ from two elements of the first cyclic group $\mathbb{G}_1$. The function e preferably is an admissible pairing, as described above. First and second generators, P and P', of the first group $\mathbb{G}_1$ are selected in block 206. In block 208, first and second secret numbers s and s' are selected. Optionally, a new s' may be chosen for each new signature. A function H is selected in block 210 such that the function H is capable of generating an element of the first cyclic group $\mathbb{G}_1$ from a first string of binary digits. In block 212, a public point $P_1 = H_1(ID_1)$ is generated for each of the t members of the set. A private point $sP' + s'P_1$ is generated for the signer in block 214.

The digital message M is signed in block 216 by generating the digital signature Sig using at least the signer's private point $(sP' + s'P_1)$ and the public point $P_i$ of each of the t members of the set. For instance, the digital signature may be generated in the following manner. Random numbers $r_M$ and $r_i$ for $1 \leq i \leq t$ are selected, and a message function value $P_M = H_2(M)$ is generated. The digital signature itself is then generated using $Sig = [U, V_1, \ldots, V_t, V_M]$ wherein $$U = sP' + s'P_1 + r_1P_1 + r_2P_2 + \ldots + r_tP_t + r_MP_M, V_1 = s'P + r_1P, V_M = r_MP, \text{ and } V_i = r_iP \text{ for } 2 \leq i \leq n.$$

In block 218, using at least the public point $P_i$ of each of the t members of the set, the digital signature Sig is verified to have been generated by a member of the set. For instance, the signature may be verified by confirming that $$e(U, P) = e(P', sP)e(P_M, V_M)\prod_{i=1}^{t} e(P_i, V_i).$$

The following is an example of an identity-based ring signature for two entities having identities $ID_1$ and $ID_2$ according to the method described above. The private key provided by the PKG for the first entity may be represented as $(sP' + r_1P_1, r_1P)$, and the private key provided by the PKG for the second entity may be represented as $(sP' + r_2P_2, r_2P)$. The first part of the first point in each of the private keys is $sP'$, which ties each of the entities to the PKG. This portion of each private key must remain constant. The remainder of each private key may be changed, however. For instance, an equally valid private point for the first entity is $(sP' + r_1'P_1, r_1'P)$ for any $r_1'$. This flexibility is exploited to enable the creation of a ring signature. A ring signature for these two entities has the form $(sP' + r_1'P_1 + r_2'P_2 + r_MP_M, r_1'P, r_2'P, r_MP)$ for some $r_1'$ and $r_2'$. The identities of both entities are embedded in this ring signature by the use of their public points $P_1$ and $P_2$. Moreover, either client can produce such a ring signature.

For instance, the first entity may produce a ring signature for both entities as follows. For convenience, let the first entity's private key be represented as $(S_1, R_1)$. The first entity chooses random numbers b and $r_2'$, and computes the ring signature $(S_1 + bP_1 + r_2'P_2 + r_MP_M, R_1 + bP, r_2'P, r_MP)$, where $r_1' = r_1 + b$ for some random b. This is a valid ring signature for the first and second entities. Note that if the first entity always chooses b=0, then it would be obvious that the first entity created each signature. Using a random b makes it impossible to determine which of the two entities created the ring signature. Similarly, the second entity may choose random numbers b and $r_1'$, and compute the ring signature $(S_2 + r_1'P_1 + bP_2 + r_MP_M, r_1'P, R_2 + bP, r_MP)$.

A third entity having identity $ID_3$, however, may not create a valid ring signature for the first two entities. The private key provided by the PKG to the third entity may be represented as $(sP' + r_3P_3, r_3P)$. Because the third entity cannot remove its public point $P_3$ from its private key, the third entity's private key is "tainted" by its identity. This taint cannot be removed, and thus the third entity cannot forge a valid ring signature for the first two entities. Only the first two entities may create such a ring signature, essentially by adding the other entity's identity to the signing entity's private key.

The ring signature scheme described above also may be modified to create a hierarchical ring signature scheme. A hierarchical identity-based ring signature scheme will now be discussed with reference to FIG. 3, which shows a flow diagram illustrating a method of generating and verifying a ring signature Sig of a message M communicated between a signer and a verifier in a hierarchy according to another presently preferred embodiment of the invention. The method enables a signer from a ring of t ring members in a hierarchy to generate a ring signature for the t ring members. Each of the t entities is associated with an ID-tuple such as $(ID_{i1}, \ldots, ID_{il_i})$, where $l_i$ represents the level of the respective entity in the hierarchy. The method begins in block 302 by generating first and second cyclic groups $\mathbb{G}_1$ and $\mathbb{G}_1$ of elements. In block 304, a function e is selected, such that the function e is capable of generating an element of the second cyclic group $\mathbb{G}_1$ from two elements of the first cyclic group $\mathbb{G}_1$. The function e preferably is an admissible pairing, as described above. A root generator $P_0$ of the first cyclic group $\mathbb{G}_1$ is selected in block 306. In block 308, a random root key generation secret $s_0$ associated with and known only to the root PKG is selected. Preferably, $s_0$ is an element of the cyclic group $\mathbb{Z}/q\mathbb{Z}$. A root key generation parameter $Q_0 = s_0P_0$ is generated in block 310. Preferably, $Q_0$ is an element of the first cyclic group $\mathbb{G}_1$. In block 312, a first function $H_1$ is selected such that $H_1$ is capable of generating an element of the first cyclic group $\mathbb{G}_1$ from a first string of binary digits. A second function $H_2$ is selected in block 314, such that $H_2$ also is capable of generating an element of the first cyclic group $\mathbb{G}_1$ from a first string of binary digits. The functions of blocks 302 through 314 are part of the Root Setup algorithm described above, and preferably are performed at about the same time. By way of example, functions such as those disclosed in Boneh-Franklin may be used as $H_1$ and $H_2$.

The next series of blocks (blocks 316 through 324) show the functions performed as part of Lower-level Setup algorithm. In block 316, a public element $P_{il}$ is generated for each of the $l_i - 1$ ancestral lower-level PKGs associated with each of the t ring members. Each of the public elements, $P_{il} = H_1(ID_{i1}, \ldots, ID_{il})$ for $1 \leq i \leq t$ and $1 \leq l \leq (l_i - 1)$, preferably is an element of the first cyclic group $\mathbb{G}_1$. Although represented in a single block, generation of all the public elements $P_{il}$ may take place over time, rather than all at once.

A lower-level key generation secret $s_{il}$ for $1 \leq i \leq t$ and $1 \leq l \leq (l_i - 1)$ is selected (block 318) for each of the $l_i - 1$ ancestral lower-level PKGs associated with each of the t ring members. The lower-level key generation secrets $s_{il}$ preferably are elements of the cyclic group $\mathbb{Z}/q\mathbb{Z}$ and each lower-level key generation secret $s_{il}$ preferably is known only to its associated lower-level PKG. Again, although represented in a single block, selection of the lower-level key generation secrets $s_{il}$ may take place over time, rather than all at once.

A lower-level secret point $S_{il}$ is generated (block 320) for each of the $l_i - 1$ ancestral lower-level PKGs associated with each of the t ring members. Each lower-level secret element, $S_{il}=S_{i(l-1)}+s_{i(l-1)}P_{il}$ for $1 \leq i \leq t$ and $1 \leq l \leq (l_i-1)$, preferably is an element of the first cyclic group $\mathbb{G}_1$. Although represented in a single block like the public elements $P_{il}$ and the secrets $s_{il}$, generation of the secret elements $S_{il}$ may take place over time, rather than all at once. For purposes of these iterative key generation processes, $S_0$ may be defined to be the identity element of $\mathbb{G}_1$.

A lower-level key generation parameter $Q_{il}$ also is generated (block 322) for each of the $l_i-1$ ancestral lower-level PKGs associated with each of the t ring members. Each of the key generation parameters, $Q_{il}=s_{il}P_0$ for $1 \leq i \leq t$ and $1 \leq l \leq (l_i-1)$, preferably is an element of the first cyclic group $\mathbb{G}_1$. Again, although represented in a single block, generation of all the key generation parameters $Q_{il}$ may take place over time, rather than all at once.

The functions of the next two blocks (blocks 324 and 326) are performed as part of the Extraction algorithm described above. A ring member public point $P_{il_i}$ associated with each of the t ring members is generated in block 324. Each ring member public point, $P_{il_i}=H_1(ID_{il},\ldots,ID_{il_i})$ for $1 \leq i \leq t$, preferably is an element of the first cyclic group $\mathbb{G}_1$. A ring member secret point $S_{il_i}$ associated with each of the t ring members is then generated in block 326. Each ring member secret point, $$S_{il_i} = S_{i(l_i-1)} + s_{i(l_i-1)}P_{il_i} = \sum_{l=1}^{l_i} s_{i(l-1)}P_{il}$$

for $1 \leq i \leq t$, also preferably is an element of the first cyclic group $\mathbb{G}_1$.

For convenience, the first function $H_1$ optionally may be chosen to be an iterated function so that, for example, the public points $P_{il}$ may be computed as $H_1(P_{i(l-1)},ID_{il})$ rather than $H_1(ID_{i1},\ldots,ID_{il})$.

Figure 3:
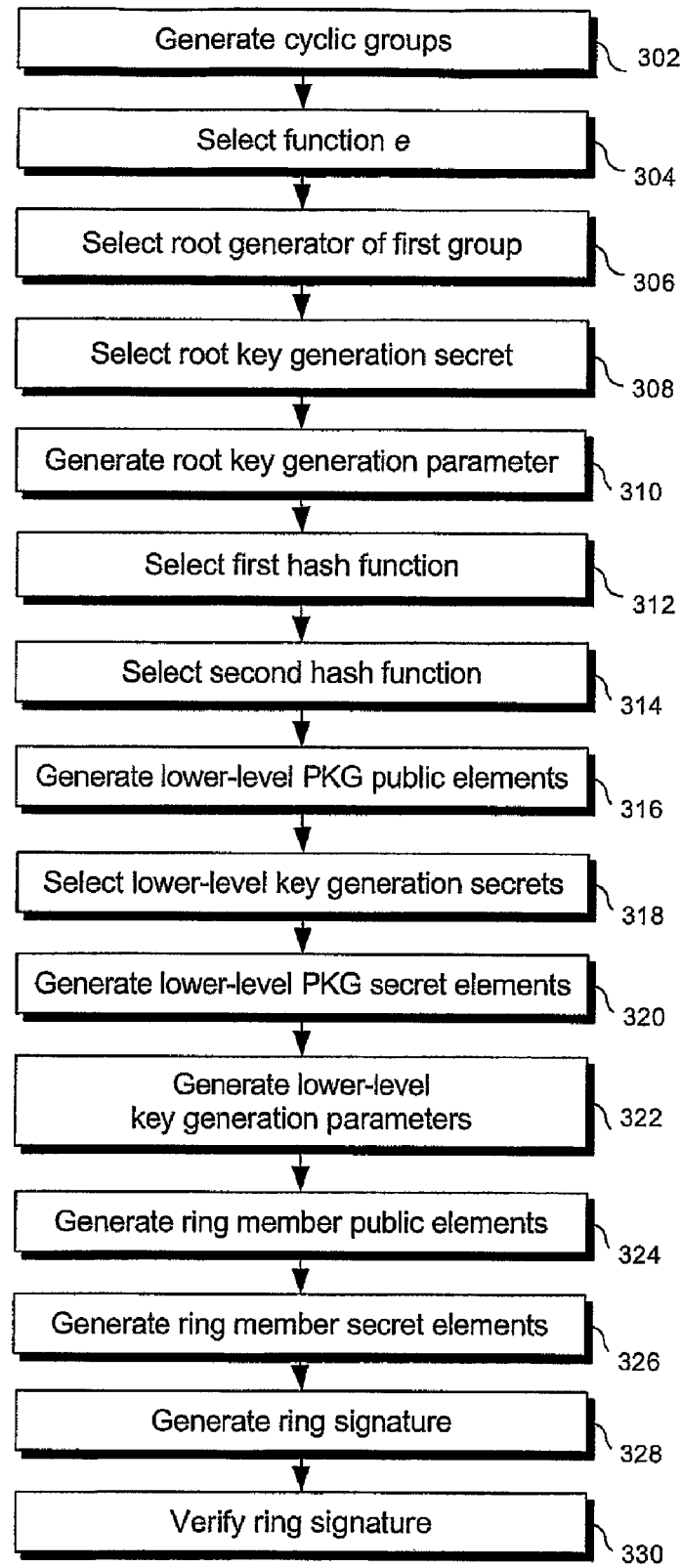
FIG. 3 shows a flow diagram illustrating a method of generating and verifying a ring signature Sig of a digital message M communicated between a signer and a verifier in a hierarchy according to another presently preferred embodiment of the invention.

The last two blocks shown in FIG. 3 (blocks 328 and 330) represent the Signature and Verification algorithms described above. In block 328, the message M is signed by a signer having the ID-tuple $(ID_{j1},k,ID_{jl_j})$ to generate a ring signature Sig. The Signature algorithm preferably uses at least the signer's private point $S_{jl_j}$ and the ID-tuples $(ID_{il},\ldots,ID_{il_i})$ for each of the t ring members. The ring Signature Sig is then verified in block 330 to confirm that it was signed by one of the t ring members. The verification preferably uses at least the ID-tuples $(ID_{il},\ldots,ID_{il_i})$ for each of the t ring members. These ID-tuples correspond to public point-tuples $P_{ik}=H(ID_{il},\ldots,ID_{ik})$.

For instance, the Signature algorithm may begin by eliminating the redundancy among the public point-tuples $P_{jk}$ of the t ring members. There will be redundancy among these point-tuples if any of the ring members share common ancestral PKGs. The non-redundant set of public points from the t public point-tuples may be represented by the set of points $R=\{R_1,\ldots,R_x\}$. The signer then generates the ring signature in the form $[U, V_1, \ldots, V_x, V_M]$, where $U=sP'+r_1R_1+\ldots+r_xR_x+r_MP_M$, $V_k=r_kP$ for $1 \leq k \leq x$, and $V_M=r_MP$. To preserve its anonymity among the ring members, the signer chooses $r_k$ randomly for points $R_k$ that are not in its ID-tuple, and it "obscures" the scalar for points $R_k$ that are in its ID-tuple, using the method described above. This signature may be verified to confirm that the signer is a one of the t ring members by confirming that $$e(U, P) = e(P', sP)e(P_M, V_M)\prod_{k=1}^{x} e(R_k, V_k).$$

Hierarchical Identity-Based Proxy Signatures

Proxy signatures allow a designated person or group of persons, called proxy signers, to sign on behalf of the original signer. A proxy signature scheme should have the following properties:

Strong unforgeability: The proxy signer can create valid proxy signatures for the original signer. Any other third party, including the original signer, is unable to forge a proxy signature.

Strong identifiability: Anyone can identify the proxy signer from a proxy signature.

Strong undeniability: The proxy signer cannot repudiate the creation of a valid signature.

Figure 4:
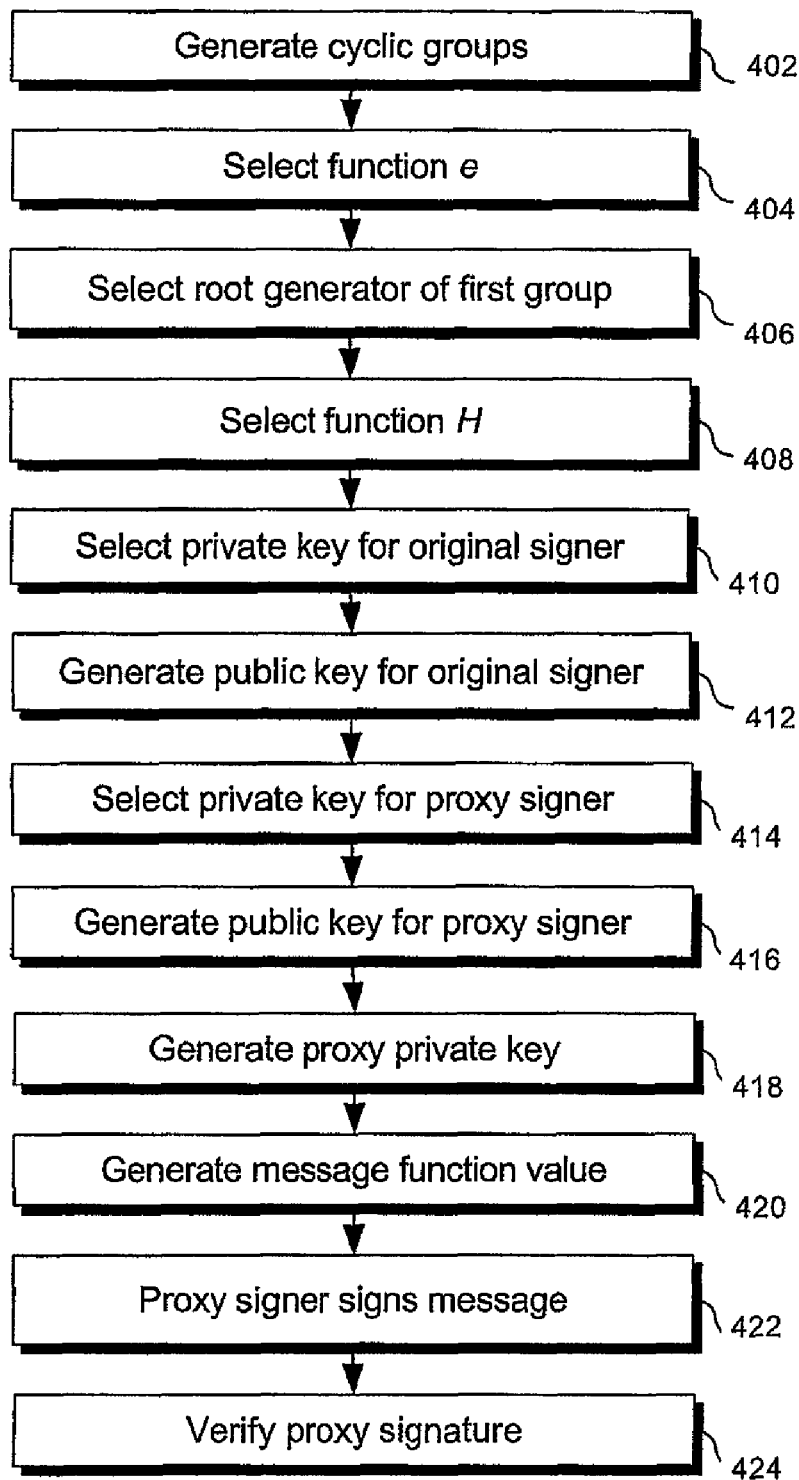
FIG. 4 shows a flow diagram illustrating a method of generating and verifying a proxy signature Sig of a digital message M according to another embodiment of the present invention.

The present invention provides hierarchical identity-based proxy signature schemes. FIG. 4 shows a flow diagram illustrating a method of generating and verifying a digital proxy signature Sig of a digital message M according to another embodiment of the present invention. The signature Sig is signed by a proxy signer on behalf of an original signer. The method begins in block 402 by generating first and second cyclic groups $\mathbb{G}_1$ and $\mathbb{G}_1$ of elements. In block 404, a function e is selected, such that the function e is capable of generating an element of the second cyclic group $\mathbb{G}_1$ from two elements of the first cyclic group $\mathbb{G}_1$. The function e preferably is an admissible pairing, as described above. A generator P of the first group $\mathbb{G}_1$ is selected in block 406. A function H is selected in block 408 such that the function H is capable of generating an element of the first group $\mathbb{G}_1$ from a string of binary digits. In block 410, a private key $s_{or}$ is selected for the original signer. A public key $s_{or}P$ is generated for the original signer in block 412. Similarly, in block 414, a private key $s_{pr}$ is selected for the proxy signer, and a public key $s_{pr}P$ is generated for the proxy signer in block 416. The original signer gives the proxy signer a proxy private key $s_{or}P_{pr}$ in block 418, wherein $P_{pr}=H(s_{pr}P)$. To sign a message on behalf of the original signer, the proxy signer first generates a message function value $P_M=H(M)$ in block 420. Alternatively, other information in addition to the message M may be used to generate the message function value $P_M$. As will be understood in the art, inputs to the function H, as well as the function itself, may be adjusted in various ways. For instance, the original signer may limit the scope of the proxy signer's authority by including a "contract" C inside the function, such that $P_{pr}=H(s_{pr}P,C)$. The proxy signer then signs the digital message M in block 422 by generating the digital signature $Sig=s_{or}P_{pr}+s_{pr}P_M$. To verify that the proxy's signature represents the signature of the original signer, the verifier confirms that $e(Sig,P)=e(P_{pr},s_{or}P)e(P_M,s_{pr}P)$ in step 424.

Hierarchical Identity-Based Online/Offline Signatures

For many applications, the total time required to sign a message is not as important as the online signing time. The online signing time generally is considered to be the time the signer needs to generate a signature after obtaining the message. Online/offline signature schemes have been proposed to reduce the time required for online signing. For instance, one such scheme employs a "trapdoor hash function" h and the "hash sign switch" paradigm. However, online/offline signature schemes have not been available for hierarchical identity-based signature systems.

Figure 5:
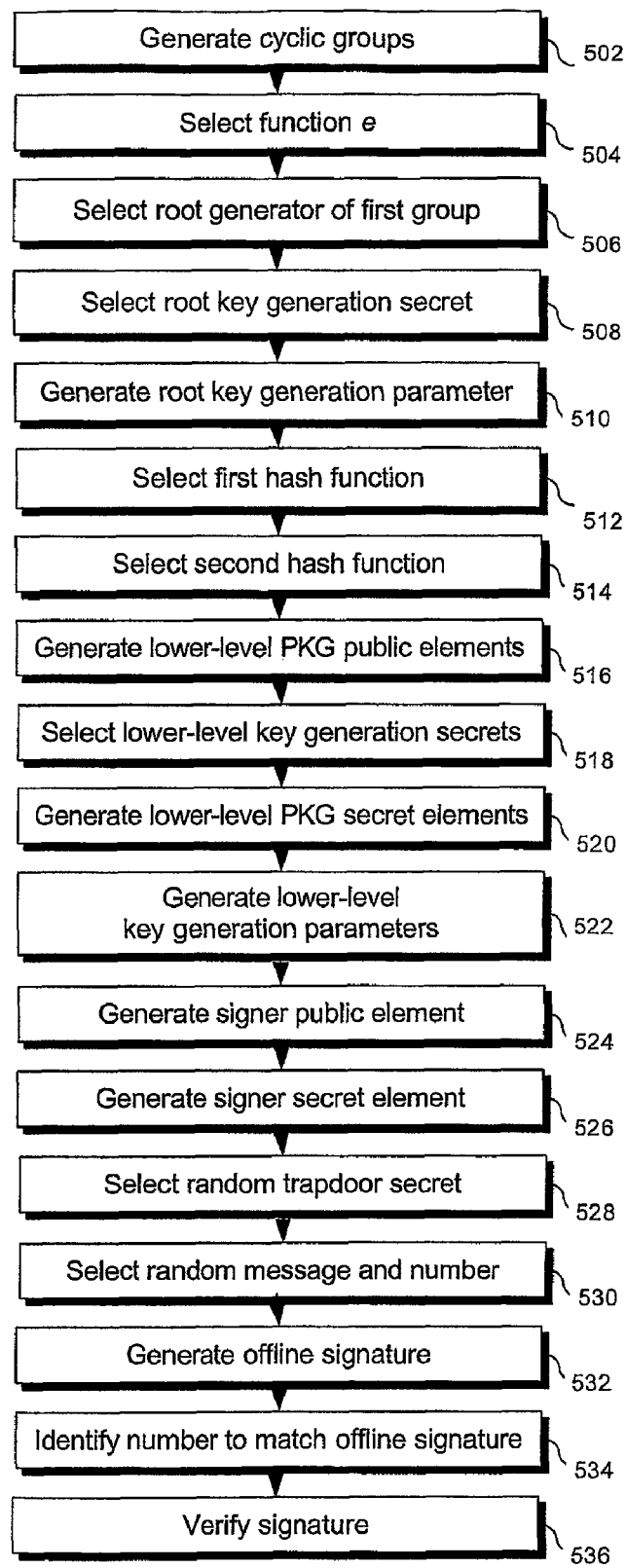
FIG. 5 shows a flow diagram illustrating a method of generating and verifying a signature Sig of a digital message M according to another embodiment of the present invention, wherein parts of the Signature and Verification algorithms may be completed offline.

The present invention provides online/offline hierarchical identity-based signature schemes. FIG. 5 shows a flow diagram illustrating a method of generating and verifying a digital signature Sig of a digital message M according to another embodiment of the present invention. This method includes a two-stage signature process in the context of a hierarchical identity-based system. The first stage of the signature process may be completed offline. This leaves only the second stage of the signature process to be completed online, thereby reducing the online signing time.

The signer y in this hierarchical scheme is t levels below the root PKG in the hierarchy and is associated with the ID-tuple $(ID_{y1}, \ldots, ID_{yt})$. The signer's ID-tuple includes identity information $ID_{yt}$ associated with the signer, as well as identity information $ID_{yi}$ associated with each of its t−1 ancestral lower-level PKGs in the hierarchy. The method begins in block 502 by generating first and second cyclic groups $\mathbb{G}_1$ and $\mathbb{G}_1$ of elements. In block 504, a function e is selected, such that the function e is capable of generating an element of the second cyclic group $\mathbb{G}_1$ from two elements of the first cyclic group $\mathbb{G}_1$. The function e preferably is an admissible pairing, as described above. A root generator $P_0$ of the first cyclic group $\mathbb{G}_1$ is selected in block 506. In block 508, a random root key generation secret $s_0$ associated with and known only to the root PKG is selected. Preferably, $s_0$ is an element of the cyclic group $\mathbb{Z}/q\mathbb{Z}$. A root key generation parameter $Q_0 = s_0 P_0$ is generated in block 510. Preferably, $Q_0$ is an element of the first cyclic group $\mathbb{G}_1$. In block 512, a first function $H_1$ is selected such that $H_1$ is capable of generating an element of the first cyclic group $\mathbb{G}_1$ from a first string of binary digits. A second function $H_2$ is selected in block 514, such that $H_2$ also is capable of generating an element of the first cyclic group $\mathbb{G}_1$ from a first string of binary digits. By way of example, functions such as those disclosed in Boneh-Franklin may be used as $H_1$ and $H_2$. In fact, the functions $H_1$ and $H_2$ may be exactly the same function. However, there is a potential pitfall. An attacker may try to get the signer to sign $M=ID_t$, wherein $ID_t$ represents an actual identity. In this case, the signer's signature may actually be a private key, which thereafter may be used to decrypt messages and forge signatures. This pitfall may be avoided, however, by using some expedient—such as a bit prefix or a different function for $H_2$—that distinguishes between signing and private key extraction. The functions of blocks 502 through 514 are part of the Root Setup algorithm described above, and preferably are performed at about the same time.

The next series of blocks (blocks 516 through 524) show the functions performed as part of the Lower-level Setup algorithm. In block 516, a public element $P_{yi}$ is generated for each of the signer's t−1 ancestral lower-level PKGs. Each of the public elements, $P_{yi} = H(ID_{y1}, \ldots, ID_{yi})$ for $1 \leq i \leq t-1$, preferably is an element of the first cyclic group $\mathbb{G}_1$. Although represented in a single block, generation of all the public elements $P_{yi}$ may take place over time, rather than all at once.

A lower-level key generation secret $s_{yi}$ is selected (block 518) for each of the signer's t−1 ancestral lower-level PKGs. The lower-level key generation secrets $s_{yi}$ preferably are elements of the cyclic group $\mathbb{Z}/q\mathbb{Z}$ for $1 \leq i \leq t-1$, and each lower-level key generation secret $s_{yi}$ preferably is known only to its associated lower-level PKG. Again, although represented in a single block, selection of the secrets $s_{yi}$ may take place over time, rather than all at once.

A lower-level secret element $S_{yi}$ is generated (block 520) for each of the signer's m ancestral lower-level PKGs. Each lower-level secret element, $S_{yi} = S_{y(i-1)} + s_{y(i-1)} P_{yi}$ for $1 \leq i \leq t-1$, preferably is an element of the first cyclic group $\mathbb{G}_1$.

Although represented in a single block like the public elements $P_{yi}$ and the secrets $s_{yi}$, generation of the secret elements $S_{yi}$ may take place over time, rather than all at once. For purposes of these iterative key generation processes, $S_0$ preferably is defined to be the identity element of $\mathbb{G}_1$.

A lower-level key generation parameter $Q_{yi}$ also is generated (block 422) for each of the signer's t−1 ancestral lower-level PKGs. Each of the key generation parameters, $Q_{yi} = s_{yi} P_0$ for $1 \leq i \leq t-1$, preferably is an element of the first cyclic group $\mathbb{G}_1$. Again, although represented in a single block, generation of the key generation parameters $Q_{yi}$ may take place over time, rather than all at once.

The functions of the next two blocks (blocks 524 and 526) are performed as part of the Extraction algorithm described above. A signer public element $P_{yt}$ associated with the signer y is generated in block 524. The signer public element, $P_{yt} = H_1(ID_{y1}, \ldots, ID_{yt})$, preferably is an element of the first cyclic group $\mathbb{G}_1$. A signer secret element $S_{yt}$ associated with the signer y is then generated in block 526. The signer secret element $$S_{yt} = S_{y(t-1)} + s_{y(t-1)} P_{yt} = \sum_{i=1}^{t} s_{y(i-1)} P_{yi},$$

also preferable is an element of the first cyclic group $\mathbb{G}_1$.

For convenience, the first function $H_1$ optionally may be chosen to be an iterated function so that, for example, the public points $P_i$ may be computed as $H_1(P_{y(i-1)}, ID_{yi})$ rather than $H_1(ID_1, \ldots, ID_{yi})$.

The last two blocks shown in FIG. 5 (blocks 528 and 530) represent the Signing and Verification algorithms described above. The two-stage signing algorithm involves the use of a trapdoor hash function h, which preferably is a discrete-log-based trapdoor hash function modified, according to methods known in the art, to apply to elliptic curves. Accordingly, in block 528, a random trapdoor secret $s_{yt}' \in \mathbb{Z}/q\mathbb{Z}$ is selected. During the signing process, the signer can give $Q_{yt}' = s_{yt}' P_0$ to the verifier as its public hash key. For example, the signer could choose $s_{yt}'$ to be equal to $s_{yt}$, the signer's lower-level secret element. In any event, $s_{yt}'$ preferably should be generated anew for each signature.

The Signing algorithm continues in block 530, as the signer selects a random message M' and a random number r'. The signer then signs the random message M' in block 532 to generate the signature $[U, Q_{y1}, \ldots, Q_{yt}, Q_{yt}']$, where $$U = \left( \sum_{i=1}^{t} s_{y(i-1)} P_{yi} \right) + s_{yt} P_{M'}, \quad Q_{yi} = s_{yi} P_0$$

for $1 \leq i \leq t$, and $P_{M'} = H_2((M'+r's_{yt}') P_0)$. This portion of the Signing algorithm may be completed offline.

After the signer has identified the message M to be signed, the online portion of the Signing algorithm may be completed. In block 534, the signer determines a number r such that $M + rs_{yt}' = M' + r's_{yt}' \Leftrightarrow r = (s_{yt}')^{-1}(M'-M) + r'$, where the inverse of $s_{yt}'$ is taken modulo q. The signer may then send r to the verifier along with the message M and the signature Sig.

In step 536, The verifier may then complete the Verification algorithm and verify the signature by confirming that $$e(U, P_0) = e(Q_{yt}, P_M) \prod_{i=1}^{t} e(Q_{y(i-1)}, P_{yi}),$$

where $$P_M = H_2(MP_0 + rQ'_{yt}) = P'_M.$$

The Verification algorithm also may be broken down into online and offline stages, depending on what information the verifier has in its possession. For instance, the signer may provide the verifier with various information in advance of knowing the message M. In this way, the verifier may learn any or all of the following: (1) the signer's $Q_{yi}$ values; (2) $P_{M'}$, the most recent output of the signer's trapdoor hash function $H_2$; (3) U, the signer's partial signature on the hash function output; (4) M, the message to be signed; and/or (5) the signer's complete signature, including the value r. Using this information, the verifier may begin to verify parts of the signature, even before the message M is known or signed. For example, the verifier will know the signer's $Q_{yi}$ values if the verifier has received a previous signature from that signer. This allows the verifier to precompute all but two pairings necessary to verify the signer's signature, regardless of how deep the signer is in the hierarchy. The verifier may complete the final two pairing computations after it receives $P_M$ and U, the signer's signature on $P_M$. The signer's complete signature may be verified using point addition—the verifier computes $P_M = H_2(MP_0 + rQ_{yt}')$ and confirms that this value is the same as $P_M$. This is the only step of verification that must be completed online, because it is the only step that depends on the message M. No pairings need to be computed. Thus, the online component of verification is quite efficient.

Systems for Use with Signatures Schemes

Figure 6:
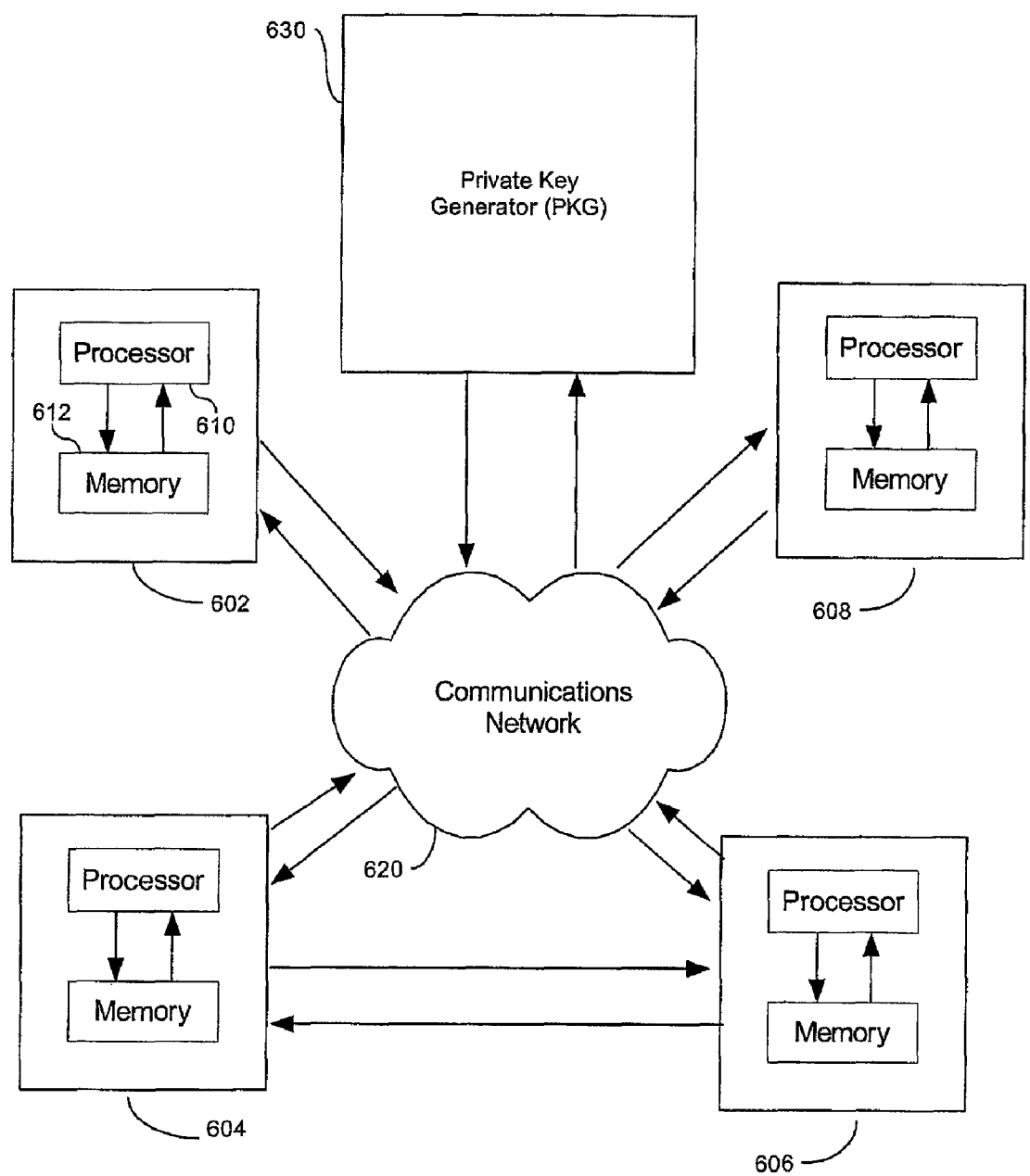
FIG. 6 shows a block diagram depicting a system for implementing signature schemes according to another embodiment of the present invention.

Various signature schemes involving bilinear mappings according to the present invention have been described. A system for implementing these schemes according to another embodiment of the present invention will now be described with reference to FIG. 6. The system includes a number of terminals 602, 604, 606, 608, each of which may be associated with an entity that generates or verifies signatures according to the signature schemes described above. The system also includes one or more private key generators (PKG) 630 that generate and distribute private keys to the various terminals 602, 604, 606, and 608.

Each terminal includes a processor 610 in bidirectional communication with a memory 612. The processor 610 executes suitable program code for carrying out the procedures described above to generate or verify a digital signature. The processor 610 also executes suitable program code for generating information to be transmitted to other terminals. Suitable program code may be created according to methods known in the art. The memory 612 stores the program code, as well as intermediate results and other information used during execution of the digital signature generation and verification procedures.

A communications network 620 is provided over which the entities 602, 604, 606, and 608 and a PKG 630 may communicate. The communications network 620 may be of various common forms, including, for instance, a LAN computer network, a WAN computer network, and/or a mobile telephone network provide suitable communication networks.

The invention has been described in detail with particular reference to preferred embodiments thereof and illustrative examples, but it will be understood that variations and modifications can be effected within the spirit and scope of the invention.

The invention claimed is:

1. A method of generating a digital proxy signature Sig for a digital message M by a proxy signer on behalf of an original signer, the method comprising performing, by one or more machines, operations comprising:
    generating a first cyclic group $G_1$ of elements;
    selecting a generator P of the first cyclic group $G_1$;
    selecting a function H capable of generating an element of the first cyclic group $G_1$ from a first string of binary digits;
    selecting a private key $s_{or}$ and a public key $s_{or}P$ for the original signer in a hierarchical identity-based system;
    selecting a private key $s_{pr}$ and a public key $s_{pr}P$ for the proxy signer in the hierarchical identity-based system;
    generating a proxy private key $s_{or}P_{pr}$, wherein $P_{pr}$ is determined using the proxy signer's public key $s_{pr}P$ and the function H;
    generating a message function value $P_M = H(M)$; and
    signing the message M by generating the digital proxy signature Sig = $s_{or}P_{pr} + s_{pr}P_M$.

2. The method of claim 1 further comprising verifying the digital proxy signature Sig by confirming that $e(\text{Sig}, P) = e(P_{pr}, s_{or}P)e(P_M, s_{pr}P)$, where e is a bilinear non-degenerate mapping from $G_1 \times G_1$ into a second group $G_2$.

3. A method of generating and verifying a digital proxy signature Sig as in claim 2, wherein:
    both the first cyclic group $G_1$ and the second group $G_2$ are of the same prime order q.

4. A method of generating and verifying a digital proxy signature Sig as in claim 2, wherein:
    the first cyclic group $G_1$ is an additive group of points on a supersingular elliptic curve or abelian variety, and the second group $G_2$ is a cyclic multiplicative subgroup of a finite field.

5. A method of generating and verifying a digital proxy signature Sig as in claim 2, wherein:
    the mapping e is an admissible pairing.

6. A method of generating and verifying a digital proxy signature Sig as in claim 2, wherein:
    $P_{pr}$ is determined using $P_{pr} = H(s_{pr}P)$.

7. A method of generating and verifying a digital proxy signature Sig as in claim 2, wherein:
    $P_{pr}$ is determined using the proxy signer public key $s_{pr}P$, the function H, and one or more other function inputs.

8. A method generating a digital proxy signature Sig as in claim 1, wherein $P_{pr}$ is determined using $P_{pr} = H(s_{pr}P)$.

9. A computer-implemented method for generating a proxy private key by an original signer for a proxy signer to sign on behalf of the original signer, the method comprising performing, by one or more machines, operations comprising:
    generating the original signer's integer private key $s_{or}$ and the original signer's public key $s_{or}P$, where P is a predefined element of a first group $G_1$ which is to be provided to a verifier of the signature;
    the original signer obtaining the proxy signer's public key, and generating the proxy private key as an element of the group $G_1$, the proxy private key being equal to $s_{or}P_{pr}$, wherein $P_{pr}$ is an element of the group $G_1$ and is a value of a predefined function of the proxy signer's public key.

10. The method of claim 9 further comprising the proxy signer generating a proxy signature on a message M, the proxy signature comprising a sum Sig of the proxy private key with a value $s_{pr}P_M$, wherein $s_{pr}$ is the proxy signer's integer private key and wherein the proxy signer's public key is equal to $s_{pr}P$, and wherein $P_M$ is a value of a predefined function on the message M.

11. The method of claim 10 further comprising the verifier verifying the proxy signature, the verifying comprising the verifier obtaining the original signer's public key $s_{or}P$ and the proxy signer's public key $s_{pr}P$, and confirming that $$\hat{e}(Sig,P)=\hat{e}(P_{pr},s_{or}P)\hat{e}(P_M,s_{pr}P)$$

where $\hat{e}$ is a bilinear non-degenerate mapping from $G_1 \times G_1$ into a second group $G_2$.

12. The method of claim 9 wherein the first group $G_1$ is a cyclic group.

13. The method of claim 9 wherein P is a generator of the first group $G_1$.

14. The method of claim 13 wherein the first group $G_1$ has a prime order.

15. The method of claim 9 wherein $P_{pr}$ is the value of the predefined function which is also a function of a contract between the original signer and the proxy signer.

16. A computer-implemented method for generating a digital signature on a message M by a proxy signer on behalf of an original signer, the method comprising performing, by one or more machines, operations comprising:

the proxy signer obtaining its integer private key $s_{pr}$;

the proxy signer obtaining a proxy private key which is equal to $s_{or}P_{pr}$, where $s_{or}$ is the original signer's integer private key and $P_{pr}$ is an element of the first group $G_1$ and is a value of a predefined function of the proxy signer's public key corresponding to the proxy signer's private key $s_{pr}$;

the proxy signer generating a proxy signature as comprising a value Sig generated as a sum of $s_{or}P_{pr}$ and $s_{pr}P_M$, where $P_M$ is a value of a predefined function of the message M.

17. The method of claim 16 further comprising the verifier verifying the proxy signature, the verifying comprising the verifier obtaining a value $s_{or}P$ and the proxy signer's public key $s_{pr}P$, and confirming that $$\hat{e}(Sig,P)=\hat{e}(P_{pr},s_{or}P)\hat{e}(P_M,s_{pr}P)$$

wherein:

$\hat{e}$ is a bilinear non-degenerate mapping from $G_1 \times G_1$ into a second group $G_2$;

$P_{pr}$ is an element of the group $G_1$ and is a value of a predefined function of the proxy signer's public key equal to $s_{pr}P$.

18. The method of claim 16 wherein the first group $G_1$ is a cyclic group.

19. The method of claim 16 wherein P is a generator of the first group $G_1$.

20. The method of claim 19 wherein the first group $G_1$ has a prime order.

21. The method of claim 16 wherein $P_{pr}$ is the value of the predefined function which is also a function of a contract between the original signer and the proxy signer.

22. A computer-implemented method for verifying a digital signature to determine if the digital signature is a valid proxy signature by a proxy signer on behalf of an original signer, the method comprising confirming, by one or more machines, that $$\hat{e}(Sig,P)=\hat{e}(P_{pr},s_{or}P)\hat{e}(P_M,s_{pr}P)$$

wherein:

Sig is a value obtained from the digital signature and is an element of a first group $G_1$;

P is a predefined element of the first group $G_1$;

$\hat{e}$ is a bilinear non-degenerate mapping from $G_1 \times G_1$ into a second group $G_2$;

$P_{pr}$ is an element of the group $G_1$ and is a value of a predefined function of the proxy signer's public key;

$s_{or}P$ is the original signer's public key, and $s_{or}$ is the original signer's integer secret key;

$P_M$ is a value of a predefined function on the message M;

$s_{pr}P$ is the proxy signer's public key, and $s_{pr}$ is the proxy signer's integer secret key.

23. A method of generating and verifying a digital proxy signature Sig as in claim 22, wherein:

the mapping $\hat{e}$ is an admissible pairing.

24. The method of claim 22 wherein the first group $G_1$ and the second group $G_2$ are cyclic groups.

25. A method of generating and verifying a digital proxy signature Sig as in claim 24, wherein:

the first cyclic group $G_1$ is an additive group of points on a supersingular elliptic curve or abelian variety, and the second cyclic group $G_2$ is a multiplicative subgroup of a finite field.

26. The method of claim 24 wherein P is a generator of the first group $G_1$.

27. The method of claim 24 wherein the first group $G_1$ and the second group $G_2$ have the same prime order.

28. The method of claim 22 wherein $P_{pr}$ is the value of the predefined function which is also a function of a contract between the original signer and the proxy signer.

29. A computer-readable manufacture containing program code for performing the method of claim 1.

30. A computer-readable manufacture containing program code for performing the method of claim 9.

31. A computer-readable manufacture containing program code for performing the method of claim 10.

32. A computer-readable manufacture containing program code for performing the method of claim 11.

33. A computer-readable manufacture containing program code for performing the method of claim 16.

34. A computer-readable manufacture containing program code for performing the method of claim 22.

35. A system comprising one or more computer processors and memory which stores program code for execution by the one or more computer processors, the program code being for performing the method of claim 1.

36. A system comprising one or more computer processors and memory which stores program code for execution by the one or more computer processors, the program code being for performing the method of claim 9.

37. A system comprising one or more computer processors and memory which stores program code for execution by the one or more computer processors, the program code being for performing the method of claim 10.

38. A system comprising one or more computer processors and memory which stores program code for execution by the one or more computer processors, the program code being for performing the method of claim 11.

39. A system comprising one or more computer processors and memory which stores program code for execution by the one or more computer processors, the program code being for performing the method of claim 16.

40. A system comprising one or more computer processors and memory which stores program code for execution by the one or more computer processors, the program code being for performing the method of claim 22.

41. The method of claim 1 wherein each said machine comprises one or more processors and memory, and each said operation is performed by the one or more processors executing program code stored in the memory.

42. The method of claim 9 wherein each said machine comprises one or more processors and memory, and each said operation is performed by the one or more processors executing program code stored in the memory.

43. The method of claim 16 wherein each said machine comprises one or more processors and memory, and each said operation is performed by the one or more processors executing program code stored in the memory.

44. The method of claim 22 wherein each said machine comprises one or more processors and memory, and said confirming is performed by the one or more processors executing program code stored in the memory.

* * * * *